United States Patent [19]

Gutierrez Rubio

[11] Patent Number: 4,646,632
[45] Date of Patent: Mar. 3, 1987

[54] FRUIT SLICING MACHINE

[75] Inventor: Joaquin Gutierrez Rubio, Seville, Spain

[73] Assignee: Sociedad Anonima de Racionalizacion y Mechanizacion (SADRYM), Seville, Spain

[21] Appl. No.: 661,195

[22] Filed: Oct. 15, 1984

[51] Int. Cl.[4] .......................... A23N 4/08; A23N 3/00
[52] U.S. Cl. ................................ 99/538; 83/425.3; 83/435.2; 99/547
[58] Field of Search .................. 99/537, 538, 547–550, 99/552, 494; 83/425.2, 425.3, 435.2; 198/779, 387

[56] References Cited

U.S. PATENT DOCUMENTS

| 3,080,955 | 3/1963 | Fennell | 198/387 |
| 3,688,826 | 9/1972 | Amori | 99/552 |
| 3,915,082 | 10/1975 | Rejsa et al. | 99/552 |
| 4,041,822 | 8/1977 | Gabel | 83/425.3 |

Primary Examiner—Timothy F. Simone
Attorney, Agent, or Firm—Cushman, Darby & Cushman

[57] ABSTRACT

Olives from which the pits have already been removed are deposited on the upward-sloping carrying run of an endless conveyor which is made of a succession of rollers mounted to chains entrained about sprockets. The rollers have flexible disk-like fins of progressively increasing and decreasing diameter from fin to fin so that the olives tend to settle into pockets and orient with their lengths crosswise of the belt as the rollers are rotated. The belt conveys the olives into a shaft of slicing disks. Olive slices are received between slicing disks and an assisting roller pushes in the remainder of any olive only partially sliced through, except that contact of the slicing disks with any pit still contained in an olive pushes that olive more deeply into a respective inter-roller pocket by flexing the respective roller fins. At separate locations along the conveyor, a comb pulls the olive slices out from between the slicing disks, and the pocket-entrapped pit-containing olives are dislodged.

6 Claims, 9 Drawing Figures

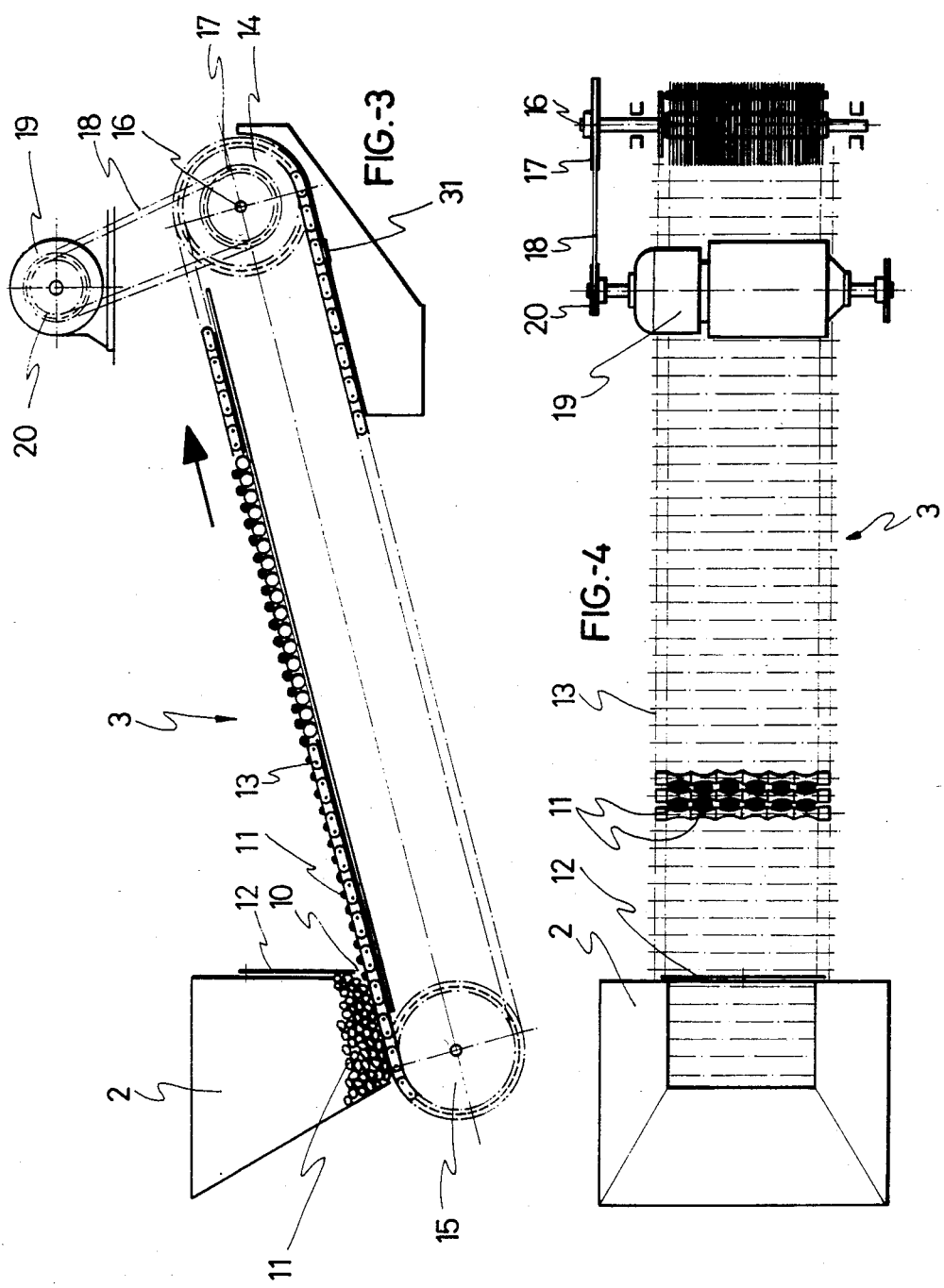

FRUIT SLICING MACHINE

BACKGROUND OF THE INVENTION

This invention refers to a slicing machine for fruit, especially olives, its aim obviously being to cut the latter in slices.

Within the field of table olives, i.e., olives intended for direct consumption, there is a considerable sector of the market which calls for olives cut in the form of slices.

The machine which the invention proposes is equipped to receive table olives, once pitted, and to cut them in slices at a very considerable operative rate, as this machine is capable of cutting over 120 fruit per second.

(In the field of this invention, there is some lack of uniformity in terminology, with the term "pitted" sometimes being used to refer to fruit which has pits, and other times being used to refer to fruit from which pits have been removed. In the present text, the term "pitted" is used to refer to fruit from which pits have been removed, and the term "unpitted" is used to refer to fruit from which pits have not been removed. Pits are sometimes referred to herein as "stones".)

Due to the fact that the olives must previously be processed in a pitter, and that this type of machine usually has frequent failures, i.e. that in the final product supplied by them there is a certain percentage of unpitted fruit, which varies according to the type of machine, in the one which the invention proposes, a special structure has been designed through which the fruit with stones which reach the cutting area is separated from the pitted and cut fruit, without damaging the elements of the cutting system in the slightest.

Another feature of the invention is centered on the fact that the machine is designed, also through the suitable devices, to slice all the pitted stones completely which reach the cutting system, irrespective of their different sizes; specifically, it is equipped to cut small olives entirely which, due to their reduced diameter, are trapped between the conveyor rollers and consequently are further from the cutting knives, thus ensuring that cutting is complete, even in these cases.

SUMMARY OF THE INVENTION

Basically, the machine which the invention proposes comprises a fruit feed hopper which unloads onto a conveyor belt, said hopper having a variable height inlet or window, with the assistance of a gate, to regulate the outflow of the fruit, while the conveyor belt, apart from constituting the transfer element from the hopper to the cutting system, has the primary purpose of positioning and suitably guiding each olive with respect to the said cutting system.

More specifically, the said conveyor belt is a roller belt in which the said rollers are made up of a plurality of sectors defining a frustrum-of-the-cone section, guided alternatingly, each pair of sectors forming a "bed" for one fruit or olive, shaped like a "diabolo", thus obtaining a real seat for each olive, with the assistance of two adjacent rollers.

These rollers are linked at their ends to two chains for the lengthwise dragging or displacement of the belt, which is equivalent to a transversal displacement of the rollers, at the same time as these rollers include pinions in their ends which, on driving the racks integrally joined to the machine bedframe, in the belt movement, make the rollers turn on their own axis, simultaneously with their traverse, through this turning movement, which is supplied to the olives or fruit concerned, these are placed in their housings with their longer axis parallel to that of the rollers.

The cutting system is made up of a shaft driven by a motor-reducer, on which shaft a plurality of circular knives are mounted, separated by spacer bushings, whose length coincides with the thickness of the slices to be obtained. The said knife-holder shaft is mounted in the general layout of the machine at the outlet of the conveyor belt, so that between the periphery of the knives and said belt, a narrowing is defined, through which the olives have to pass, and where they are cut.

In this sense, it should be stressed that the rollers making up the transport chain are provided with annular necks to hold the edge of the knives, thus ensuring a perfect cutting operation.

At the outlet of this narrow passage, a complementary roller has been provided, also grooved, which forces the insufficiently cut olives, due to their small size, to be inserted fully in the spaces formed between the knives by the spacers, thereby completing the cutting operation perfectly in all cases.

The sliced olives which during the cutting stage are housed between the circular knives are forced to leave towards a finished fruit outlet, with the aid of a separating comb, whose arms or prongs go between the knives until they contact the respective spacer bushings at a tangent; this comb releases the slices, as it is fixed, and as the cutting unit is turning.

Finally, and in order to ensure that the presence of some unpitted olives does not damage the cutting system and to avoid the stones being mixed with the finished product, it has been foreseen that the rollers corresponding to the conveyor belt be made of a resilient material, so that when the cutting knives come up against the resistance offered by the stone, this becomes entrapped between the rollers and is taken beyond the cutting area by the conveyor belt, specifically towards the bottom return area of the said belt, where they fall into an ancillary collector vessel, in some cases by themselves and in others with the aid of a bottom rack which makes the rollers turn again, and by turning inevitably releases the stone.

In this way, the olives are sliced in a fully automatic process at considerable speed, with absolute cutting reliability and without the risk of the stones of possible unpitted olives affecting the cutting system, nor of these stones mixing with the finished product.

BRIEF DESCRIPTION OF THE DRAWINGS

To assist with the description being made and to contribute towards a better understanding of the features of the invention, a set of drawings is attached to this specification, as an integral part thereof, in which the following has been shown, with an illustrative and unlimiting nature.

IN THE DRAWINGS

Figure 1:
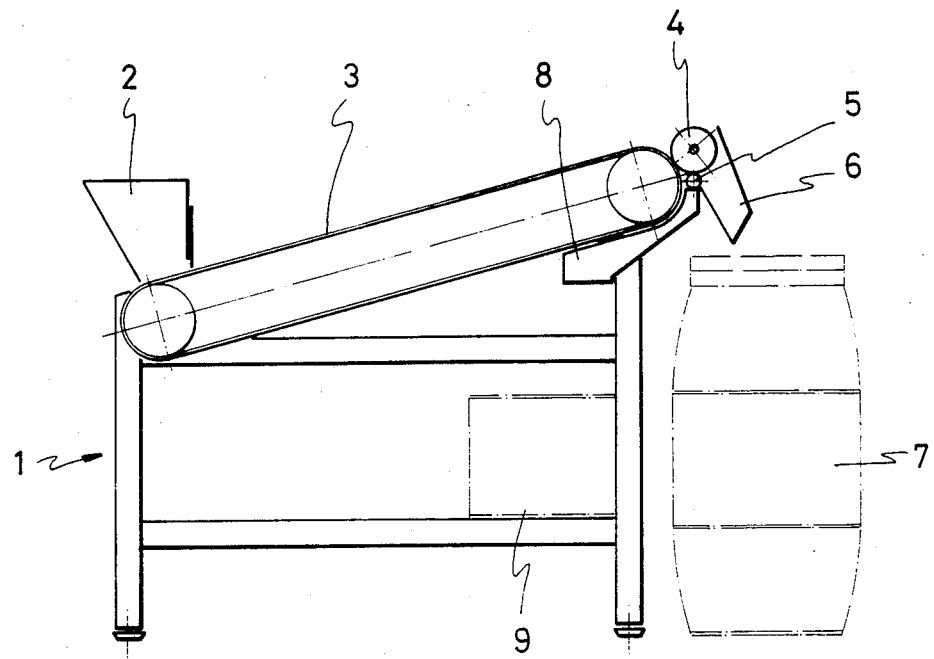

FIG. 1 shows a diagramatic side elevation illustration of a fruit slicing machine made in accordance with the principals of this invention.

Figure 2:
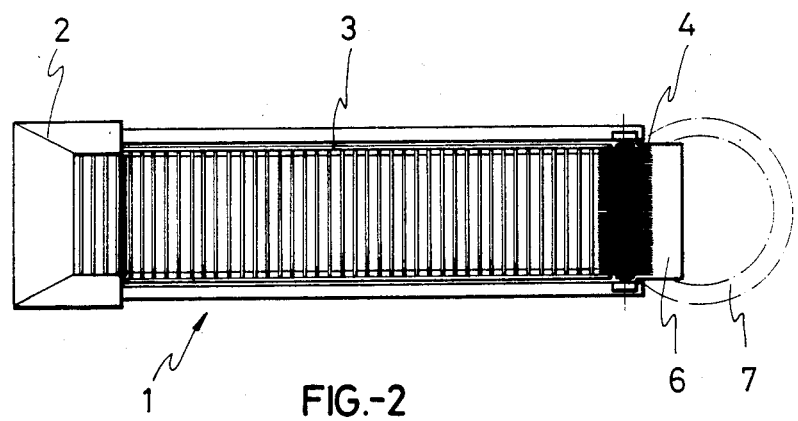

FIG. 2 shows the same machine in a plan view and in a likewise diagramatic illustration.

FIG. 3 shows a side elevation detail of the conveyor belt, the feed hopper and the drag devices of the said belt.

FIG. 4 shows the same assembly as in the previous figure, in a plan view.

Figure 5:
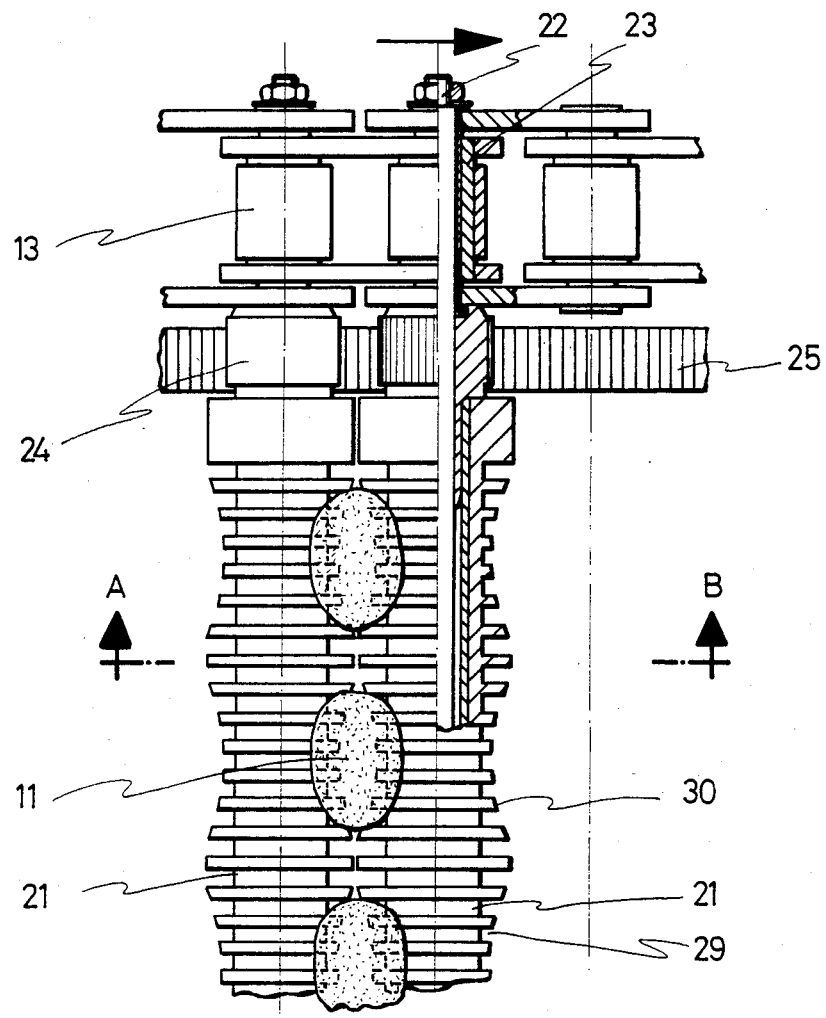

FIG. 5 shows a plan detail, considerably enlarged, with respect to the previous figures, of a pair of rollers belonging the the conveyor belt; the drag chain of these rollers and the pinions and rack turning the rollers can also be seen in this figure.

Figure 6:
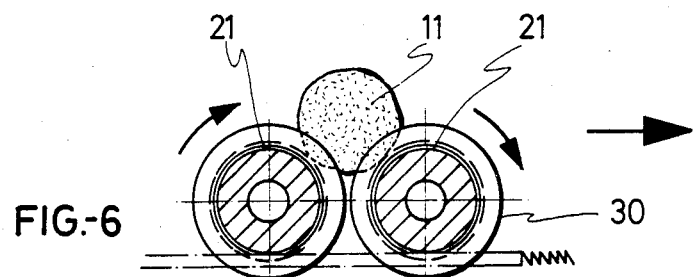

FIG. 6 shows a cross-section of the assembly illustrated in the previous figure according to the cutting line A-B in that figure.

Figure 7:
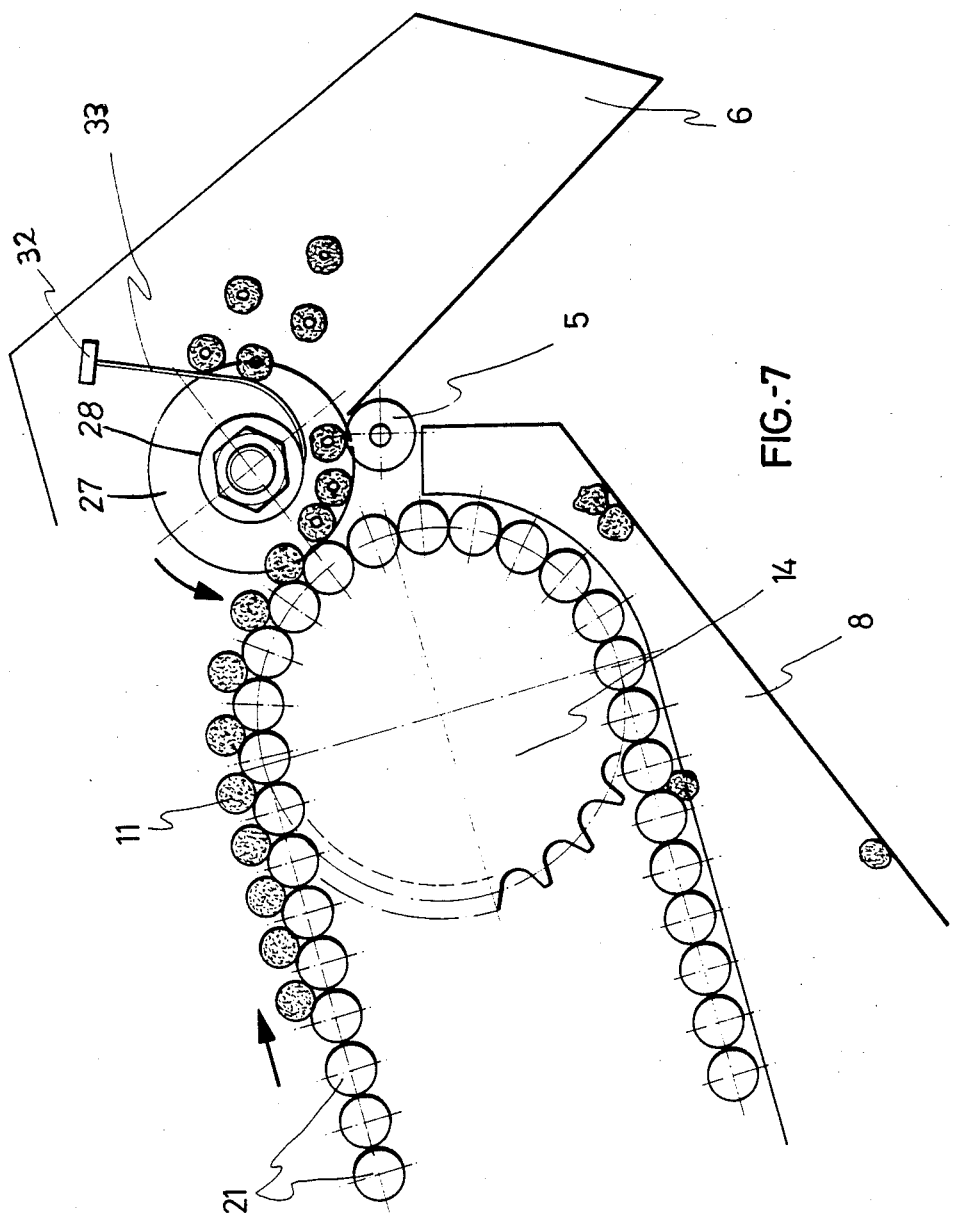

FIG. 7 shows another enlarged detail of the conveyor belt, in this case of its end corresponding to the cutting device, in which this device also appears with its respective accessories.

Figure 8:
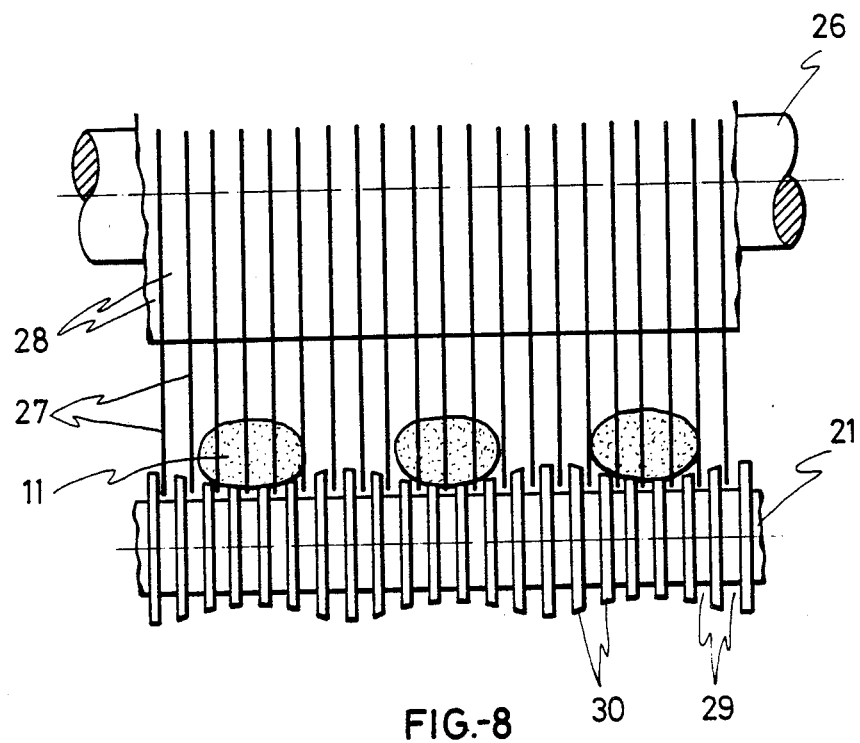

FIG. 8 shows a plan detail of the intersection area between the knife-holder shaft and the respective roller, in which the way the olive is cut can be seen perfectly.

Figure 9:
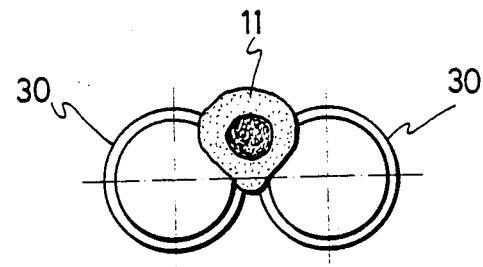

FIG. 9 shows a profile detail of two rollers on which an unpitted olive is placed, clearly showing their deformation, to avoid the stone damaging the cutting knives.

DETAILED DESCRIPTION

In the light of these figures and more specifically in FIG. 1, it can be seen how on a bedframe which has been marked generally with reference number 1, a fruit feed hopper 2 is arranged in one of its ends, which in turn places it, duly proportioned, on a conveyor belt 3, which ensures the perfect positioning of the fruit and makes it pass under a cutting device 4, with which the actual belt 3 cooperates, acting as a base or cutting support, an accessory element 5 also cooperating in this operation, thereby ensuring complete cutting, the machine being complemented with the respective removal outlet 6 of the cut fruit towards the respective vessel and collector 7, and with a stone ejecting device, towards another independent collector 9.

The hopper 2, forming a rectangular frustrum-pyramid shaped vessel, with its larger top base open and its smaller base also open, is fitted to the top or operative surface i.e. the carrying run, of the conveyor belt 3.

The said hopper is provided with an adjustable window 10, to regulate the outflow of the fruit 11, said regulation being achieved with the assistance of a vertically sliding gate 12. Regarding the said gate 12, we should stress that it is of a resilient nature, at least in its lower and operative edge, to avoid damage being caused to the pitted fruit 11.

Concerning the conveyor belt 3, this is made up of two side pairs of chains 13, each of which is assisted by two toothed wheels (i.e. sprockets), one drive wheel 14 and the other return 15, the drive wheels 14 being connected by a shaft 16, to which a pinion 17 is integrally joined, which receives the movement through an ancillary transmission chain 18, from a motor-reducer 19, provided in its output shaft with its respective pinion 20. The conveyor belt 3 is shown being arranged so as to have a carrying run 3C and a return run 3R.

A series of transversal rollers 21 is arranged between both side chains 13 and in connection with their links, these rollers, an adjacent two of which are shown in FIGS. 5 and 6, are joined to the chains through rods 22 housed in the holes of the bushings 23 on which the rollers pivot, corresponding to the actual chains, and which are marked with reference no. 13 in FIG. 5.

For the olives to reach the cutting system 4, duly spread out and guided on the conveyor belt 3, the rollers 21 have been designed to be frustum-of-the-cone shaped sectors, arranged alternatingly in position, with their generatrix slightly arched, so that between each pair of rollers, curved concave seat areas of pockets 21P are formed for the olives, as seen in full detail in FIG. 5, so that between each pair of rollers and for each pair of rollers, and for each of their sectors, a housing is obtained for a single olive which adopts the most suitable position in it, as will be seen below.

On observing the said FIG. 5, it can be seen how at the ends of the rollers 21, pinions 24 are mounted, duly joined to them, placed with respect to a rack 25, fixed to the bedframe 1, immediately under them, on which rack the pinions interlock.

Thanks to this rack, when the carrying run 3C of the conveyor belt 3 starts to move in the direction of the arrow shown in FIGS. 5 and 6, and the pinions 24 shift on the rack 25, as the latter is fixed, the rollers 21 are made to turn, according to the arched arrows shown in FIG. 6, so that the olives which leave the hopper 2 in a somewhat disorderly fashion, to pass through the window 10 to the conveyor belt, thanks to this turning movement of the rollers, are forced to adopt a position according to which their longest axis is parallel to the rollers 21, as also shown in FIG. 5.

In this way, the olives are placed in the most suitable position to be attacked by the circular knives with which the cutting system 4 is provided, so that the fruit can be sliced.

The cutting device, marked generally as number 4 in FIG. 1 and seen in greater detail in FIGS. 7 and 8, consists of a transversal shaft 26, driven by the motor-reducer itself 19, through the relevant transmission. On this shaft 26, a plurality of disc-shaped knives 27 are mounted, suitably separated, according to the thickness foreseen for the fruit slices, with the assistance of spacer bushings 28, arranged between these knives 27.

As can be seen in FIG. 8, the moment cutting takes place, the rollers 21 cross the knives 27, for which purpose said rollers 21 have perimetrical necks 29 (in other words comprise alternating larger diameter disk-like portions 30 and abruptly smaller diameter spacer-like portions 29S providing circumferential grooves having bottom and sidewalls) which the cutting peripheries of the knives 27 touch.

The cut is generally complete and the slices obtained are trapped between the knives. The slices obtained leave towards the pouring outlet 6 with the aid of a releasing comb 32 whose arms or prongs 33 are inserted between the knives 27 and touch the bushings 28 forming a tangent, as can be seen in FIG. 7.

When the olives are too small, with the cutting device disclosed, it may occur that the cutting edge of the knives does not reach the opposite surface of the fruit which has been attacked when cutting begins. This rarely happens, but may, especially if on cutting the olives, they are trapped between the rollers 21. However, and to avoid this disadvantage, an ancillary grooved roller 5 has been foreseen which, as can also be seen in FIG. 7, forces the insufficiently cut olives to be completely inserted in the hollows made between the knives by the spacers 28, whereby the cutting operation affects the whole of the fruit 11 in any event.

Finally, and in the relatively frequent case that among the olives supplied to the hopper 2, which theoretically have been pitted, there are some with stones, to avoid these stones being mixed with the finished product and causing damage to the machine, it has been provided that the rollers 21 be obtained in a resilient material, so that when the cutting knives 27 come up against the resistance of said stone, it is forced to be lodged between the rollers, as the fins or disks 30, formed by the necks 29, give way, as seen in detail in FIG. 9; the stone is trapped and conveyed by the conveyor belt 3, now in its return area, until a complementary rack 31, visible in FIG. 3 provided as a pit-containing fruit dislodging means, makes the rollers turn again in that return sector of the belt and this turning motion ejects the entrapped the stone so that it falls into the vessel 8, which can be an actual collector, or a pouring hopper going towards the bottom vessel 9, shown with a discontinuous line in FIG. 1. Accordingly, the de-pitted and pit containing olives are shunted to separate streams for separate collection at 6 and 8, respectively.

We claim:

1. A machine for slicing olives and similarly round but at least slightly elongated fruit from nearly all of which pits are missing, for instance because pits originally present in the fruit have been removed in a previous de-pitting operation, this machine comprising:

an endless conveyor belt entrained about drive and return sprockets so as to define a generally upwardly facing carrying run and a return run, this conveyor belt comprising endless chain means entrained about said sprockets, and a series of transversely extending rollers mounted to said chain means and each adapted to be rotated about its own longitudinal axis;

each said roller comprising a shaft having a succession of alternating spacer means and disk means received thereon and arranged to permit the disk means to flex upon having sufficient pressure applied thereto;

said disk means of each roller being provided, collectively, with undulating generatrix of alternatingly greater and lesser diameter along the length of each roller, and the rollers being ranked along the endless conveyor belt so that a plurality of upwardly open fruit-receiving pockets is defined by corresponding lesser diameter disk means regions of each two adjacent ones of said rollers; the disk means, even within these pockets, being sufficiently long as to prevent fruits received in such pockets from falling through said carrying run of said endless conveyor belt;

a fruit slicing station juxtaposed with a relatively downstream region of said carrying run of said endless conveyor belt, said fruit slicing station including transversally extending shaft means having a series of disk-shaped fruit slicing knives mounted thereto with such radial extent and such close spacing between adjacent knives longitudinally of this shaft means that as said rollers pass said fruit slicing station, each disk-shaped knife enters into a respective space between a respective two adjoining said disk means on the respective roller and at least two knives intersect each respective pocket for cutting each respective de-pitted fruit into at least three slices;

a fruit supplying station juxtaposed with said carrying run of said endless conveyor belt upstream of said fruit slicing station; means provided at said fruit supplying station for depositing on said endless conveyor belt a supply of generally randomly-oriented de-pitted fruit, this depositing means including means for limiting the depth of fruit being supplied to at least approximately a single layer;

means associated with said endless conveyor belt for forcibly rotating said rollers as said rollers pass from juxtaposition with said fruit supplying station to juxtaposition with said fruit slicing station, whereby individual fruit come to occupy respective ones of said pockets, and such fruit become oriented with their longitudinal axes at least approximately aligned transversally of said endless conveyor belt;

an additional roller means juxtaposed with said fruit slicing knives, this additional roller means being disposed in such close juxtaposition with said fruit slicing knives, relatively downstream of where each said knife has emerged from juxtaposition with a respective space between a respective two adjoining said disk means on a respective said roller, as to urge sufficiently further inwardly between said fruit slicing knives any sliced de-pitted fruit still having a remaining unsliced portion joining its at least three slices as to complete the slicing thereof; and comb means associated with said fruit slicing knives relatively downstream of said additional roller means, for freeing fruit slices from temporary enlodgement between said fruit slicing knives so that said fruit slices may be collected as an outlet stream thereof.

2. The machine of claim 1, further comprising:

pit-containing fruit dislodging means juxtaposed with the return run of the endless conveyor belt for dislodging from deep in respective ones of said pockets occasional pit-containing fruit which have become enlodged between adjacent ones of said rollers as engagement of the respective pits by the respective fruit slicing knives has driven such fruit deeper into the respective said pockets, which has been accomodated by flexure of respective ones of said disk means, this pit-containing fruit dislodgement means being adapted to shunt fruit dislodged thereby into an outlet stream which is separate from said outlet stream of said fruit slices.

3. The machine of claim 1, wherein:

said depositing means at said fruit supplying station comprises an open top, open bottom, downwardly convergent-walled hopper having a vertically adjustable, flexible lower edge portion provided on a downstream-facing side thereof, for regulating said depth of fruit being deposited on said carrying run of said endless conveyor belt.

4. The machine of claim 1, wherein:

said means for forcibly rotating said rollers comprises a stationary rack means supported for juxtaposition with said shafts of said rollers, and gear means mounted on said shafts for meshing engagement with said rack means for effecting rotation of said rollers.

5. The machine of claim 4, further comprising:

pit-containing fruit dislodging means juxtaposed with the return run of the endless conveyor belt for dislodging from deep in respective ones of said pockets occasional pit-containing fruit which have become enlodged between adjacent ones of said rollers as engagement of the respective pits by the respective fruit slicing knives has driven such fruit deeper into the respective said pockets, which has been accomodated by flexure of respective ones of said disk means, this pit-containing fruit dislodgement means being adapted to shunt fruit dislodged thereby into an outlet stream which is separate from said outlet stream of said fruit slices;

said dislodging means including further stationary rack means supported for meshing engagement with said gear means, for effecting rotation of said rollers in said return run of said endless conveyor belt.

6. The machine of claim 1, wherein:

said carrying run of said endless conveyor belt is arranged to slope upwards between said fruit supplying station and said fruit slicing station so that excess fruit not initially finding an empty said pocket may roll relatively upstream until received in an empty said pocket.

* * * * *